Aug. 8, 1961  R. A. TAYLOR  2,995,504
MATERIAL HANDLING PLANT
Filed Feb. 11, 1957  3 Sheets-Sheet 1

Inventor
Richard A. Taylor
By
Pennie, Edmonds, Morton, Barrows & Taylor
Attorneys

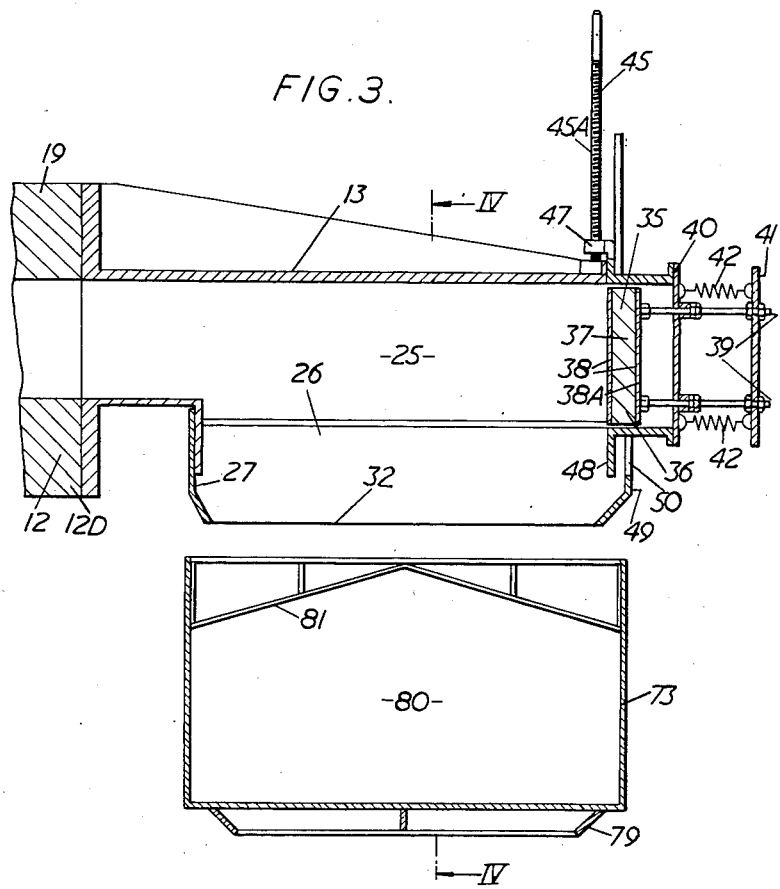

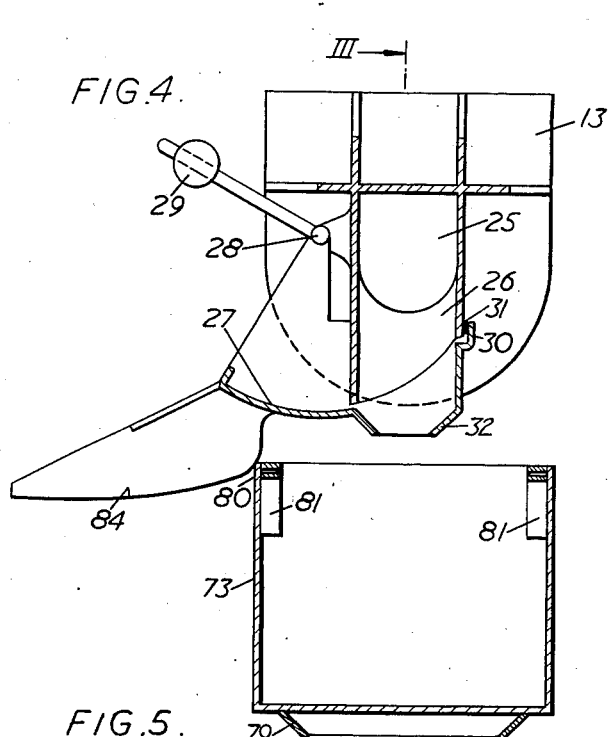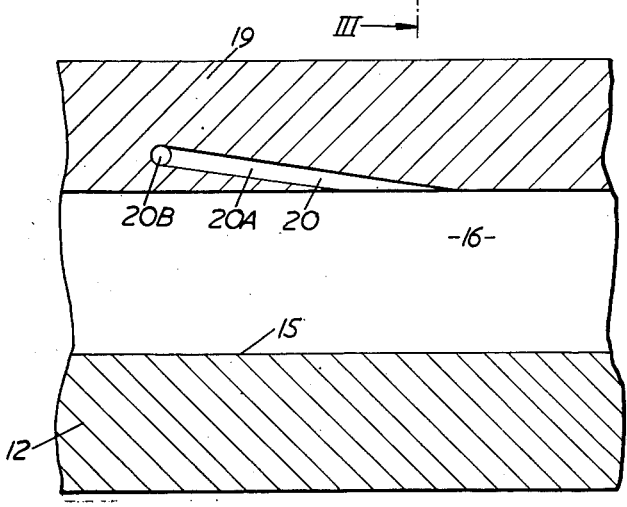

United States Patent Office 2,995,504
Patented Aug. 8, 1961

2,995,504
MATERIAL HANDLING PLANT
Richard A. Taylor, London, England, assignor to Babcock & Wilcox Limited, London, England, a British company
Filed Feb. 11, 1957, Ser. No. 639,539
Claims priority, application Great Britain Feb. 13, 1956
3 Claims. (Cl. 204—193.2)

This invention relates to material handling plant and particularly to conveying means for fuel elements withdrawn from a nuclear reactor. In nuclear reactors such as gas-cooled graphite-moderated reactors, pressurised water reactors and heterogeneous boiling reactors, fuel elements are used each of which includes fissionable material enclosed in a can. From time to time the necessity arises of replacing used fuel elements and to that end the elements to be replaced are withdrawn from the reactor into an unloading machine preparatory to being stored for a period in a pond. During the period of storage the radio-activity of the elements decreases to a suitable degree when the elements may be removed for the recovery of valuable constituents.

During the handling of the used fuel elements, care should be exercised to avoid damage to the cans, since in the event of such damage, radio-active fission products are liable to escape and contaminate the working parts of the disposal plant at the reactor site. Hence, in reactors in which the unloading machine is at a substantial distance above the pond, heavy shocks which would result from free acceleration under gravity followed by sudden stoppage are objectionable. It is desirable that the discharge of fuel elements from an unloading machine should be effected expeditiously and without exposure of the machine for effecting connection with fuel elements. It is also desirable that the fuel elements should be stored in the pond in an orderly fashion so that groups of fuel elements may be withdrawn from the pond in a proper sequence in accordance with their dates of storage in the pond.

An object of the present invention is the provision of fuel element handling plant capable of handling radio-active used fuel elements in such a manner that hazard to health is eliminated and yet with a high rate of handling so that the changing of all or part of the charge of fuel elements in a nuclear reactor may be effected rapidly.

Further objects and advantages of the invention will be apparent from the subsequent description of an embodiment of the invention.

The invention will now be described, by way of example, with reference to the accompanying largely diagrammatic drawings, in which:

FIGURE 3 is a sectional view of a discharge end of the chute shown in FIGURE 1, taken on the line III—III of FIGURE 4 and as viewed in the direction indicated by the arrows;

FIGURE 4 is a transverse sectional view taken on the line IV—IV of FIGURE 3 and as viewed in the direction indicated by the arrows; and FIGURE 5 is a transverse sectional view of a lower part of the chute shown in FIGURE 1 showing water nozzles associated therewith.

Figure 1:
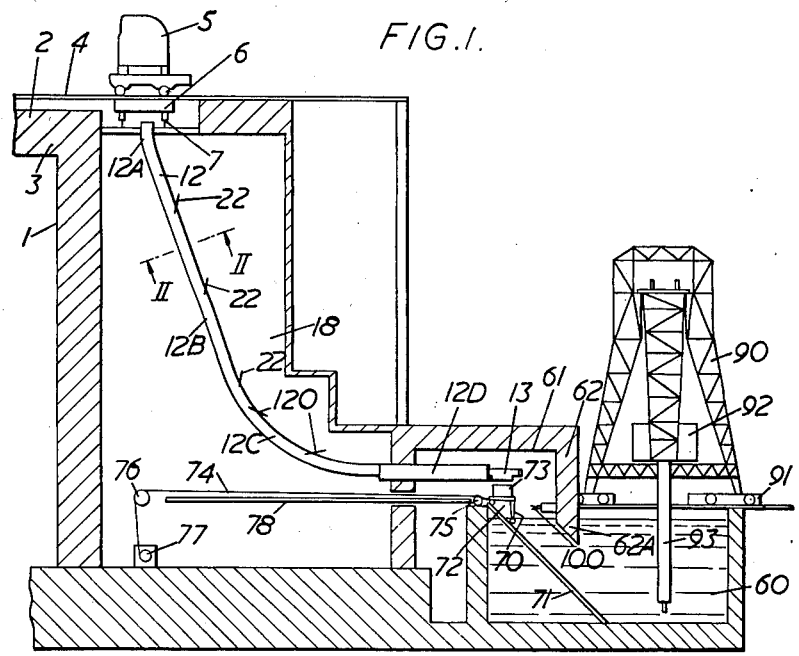
FIGURE 1 is a sectional view through an end part of a gas cooled, graphite moderated nuclear reactor and shows conveying means for used fuel elements withdrawn from the reactor.

The nuclear reactor 1 is of the gas-cooled graphite-moderated type in which the reactor core is contained within a concrete chamber 2 and spent fuel elements are periodically withdrawn and replaced with new or reconditioned elements.

In the reactor shown, removal of the spent fuel elements takes place vertically upwards through the reactor cap 3, on which is provided a system of railway tracks such as the track 4 for the guidance of an electrically controlled loading machine 5, which serves to unload the spent fuel elements and load the reactor with fresh fuel elements and may be moved to desired spent element collecting positions above the concrete cap of the reactor. A traversing carriage 6 mounted on rails 7 which extend across the tracks, such as track 4, permits the transference of the loading machine from one of the tracks to another track and its movement to the unloading position shown in FIGURE 1 above a chute 12. The loading machine is provided with a telescopic device (not shown) which may be operated to make connection both with a discharge aperture in the bottom of the loading machine and an aperture at the top of the chute 12. Both apertures are provided with suitable valves which normally close the apertures.

The chute 12 is arranged with its upper end between the rails 7 at the unloading position and includes a short vertical upper end part 12A, a steeply inclined intermediate part 12B, a curved transition part 12C, and a horizontal terminal part 12D having its discharge end connected to a discharge chamber 13 in which the axial movement of the fuel elements along the chute is terminated.

Figure 2:
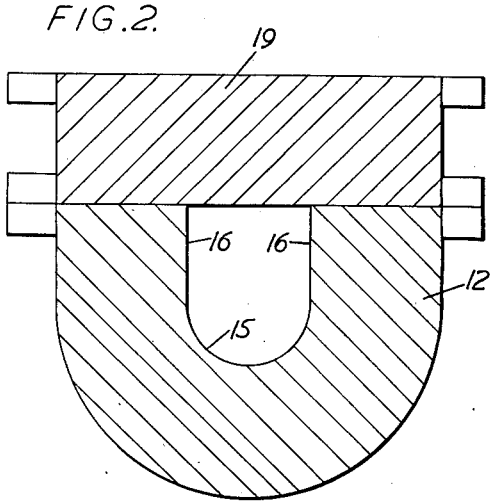
FIGURE 2 is a transverse sectional view of a chute shown in FIGURE 1, taken on the line II—II of that figure and as viewed in the direction indicated by the arrows.

The reactor shown is intended to operate with fuel elements which have overall dimensions of the order of a length of four feet and a diameter of six inches, and the chute 12 is therefore made with a curved lower surface 15 which, as viewed in transverse cross-section (see FIGURE 2), is a semi-circle having a radius of 6 inches, giving a diametrical width to this lower part of 12 inches. Above the curved surface 15, the side walls 16 of the chute are planar and tangential to the semi-circular part. With fuel elements of the size specified and with a chute dimensioned as set out above, there is practically no possibility of a fuel element becoming jammed in the chute unless it has been damaged or suffers damage during its fall through the chute.

Theoretically the chute could be in the form of a thin walled tube or trough but in practice, in order to provide biological protection for personnel entering chamber 18 surrounding the parts 12A, 12B, 12C of the chute, the chute is formed of cast iron sections bolted together, each section having a wall thickness of 12 inches and being covered with a cast iron lid 19 which is 12 inches thick.

At several locations spaced along the length of the terminal part 12D of the chute 12 fuel element advancing means in the form of water jets 20 (see FIGURE 5) are provided arranged to discharge streams of water along this part of the chute towards the discharge chamber 13 and so ensure that elements tending to come to rest in the chute part 12D do in fact reach the chamber 13. These water jets 20 are provided in the chute lids 19 and each includes a part 20A extending towards the discharge chamber 13 to give the desired direction of water jet and a further part 20B which extends through the lid transversely of the axis of the trough, so as to avoid the formation of a zone of serious weakness in the biological shielding effected by the lid, through which atomic radiation might pass. Further water jets 22 are disposed in the part 12B of the chute and are arranged to discharge downwardly along the chute. Associated with each jet is a flow controlling valve (not shown) for discontinuance of the flow of water and for regulating the velocity of discharge of water through the jet.

The discharge chamber 13 is formed by a metal casting having external strengthening ribs and providing a short axial extension 25 of the chute 12 below which is disposed a recess 26. The bottom of the recess 26 is provided with a radial cut-off valve or gate 27 pivotally mounted on hinges 28 provided on the outer surface of the casting and biassed to a closed position, in which the bottom of the recess 26 is closed, by a counterweight 29. The cut-off valve 27 is provided with an elongated discharge nozzle 32 which forms the bottom of the recess 26 when the cut-off valve 27 is in its open position and is of such size that a spent fuel element in the recess 26 may fall freely through the nozzle when the valve is in its open position. A projection 30 on the valve 27 engages the side wall of the recess 26 to index the valve at its open position, and is provided with a sealing strip 31.

The end of the chamber 13 opposite the chute 12 is provided with a buffer 35 consisting of a buffer head 36 including a thick pad 37 of resilient material, for example rubber, sandwiched between two mild steel plates 38 of which the outer plate 38A is fixedly mounted on two steel rods 39 slidably mounted in an emergency door 40 and extending in the direction of the terminal part 12D of the chute 12. The outer ends of the two rods 39 are coupled together by a yoke 41 connected to the door 40 by two tension springs 42 which bias the rods and the buffer head 36 inwardly from the door towards the chute.

The emergency door 40 is slidably mounted on the end of the chamber 13 and is provided with remotely operable operating means including a vertically extending rod 45 which is screw-threaded over a lower part 45A of its length and extends to a location a considerable distance above the chamber 13, from which location it may safely be rotated even if a radio-active spent fuel element is contained in the chamber 13. The lower part 45A of the rod 45 engages a nut member 47 provided on the door 40 and upon appropriate rotation of the rod 45 the door 40 is caused to move upwardly to uncover the front end of the chamber 13. The door 40 is provided with a depending flange 48 and the front wall 49 of the chamber 13 is cut away as indicated at 50 in order that, when the emergency door is raised, the lower boundary of the open front end of the chamber 13 shall lie at a level below the level of the terminal part of the chute 12.

The discharge chamber 13 is dispoed adjacent a pond 60 (see FIGURE 1) in which spent fuel elements are stored for a period sufficiently long for the more short-lived radiation to die away. To eliminate pollution of the atmosphere should one of the spent fuel elements become damaged in handling at the discharge end of the chute 12, the discharge end of the chute is enclosed in a chamber 61 having a front wall 62 the lower edge 62A of which dips into the pond 60 to provide an air tight seal.

Fuel element transporting means are arranged to receive fuel elements discharged from the chamber 13. Thus a skip hoist 70 is disposed in the water of the pond with the upper end of its inclined tracks 71 above the water level and immediately below the discharge chamber 13 and with the lower end of its track on the side of the front wall 62 which is remote from the discharge chamber 13. The skip hoist is operated by a cable 74 passing over appropriate pulleys 75, 76 and a motor driven drum 77 which is disposed outside the chamber 61. The part of the cable 74 which lies between the pulleys 75, 76 slopes upwardly away from the pond and has disposed below it a gutter 78 which serves to return water dripping from the cable to the pond. The distance between pulleys 75, 76 exceeds the length of track 71 so that the part of the cable which winds onto and off the winch drum 77 remains unwetted.

The skip 73 may be seen most clearly in FIGURES 3 and 4 and is in the form of a rectangular open topped basket formed from mild steel plates. The bottom of the skip is provided with a short downwardly tapering extension 79 to facilitate the nesting of one such skip on top of a second such skip when the two skips are submerged in, and supported by the floor of, the pond. The top of the skip is provided internally along two opposite sides 80 with frameworks 81 of mild steel bars to provide lifting means to facilitate its handling in a manner to be described below.

The skip hoist 70 is so disposed relative to the discharge chamber 13 that when the skip hoist is at its uppermost position and carries the skip 73, one of the sides 80 of the skip engages a cam member 84 provided on the cut-off valve 27 to retain that valve in the open position in which a spent fuel element can fall through the nozzle 31 into the skip 73. Upward movement of the skip to this position, by engagement of the skip side 80 with the cam 84 causes the cut-off valve 27 to swing from its closed position to its open position, and on the other hand downward movement of the skip from its uppermost position permits the counterweight 29 to swing the cut-off valve to the closed position in which a fuel element would be retained in the chamber 13.

Referring to FIGURE 1, a transporter crane 90 mounted on bogies 91 and having a carriage 92 capable of movement in a direction transverse to that permitted by the bogies 91 is arranged to straddle the part of the pond 60 which lies beyond the wall 62. The carriage 92 is provided with lifting tackle 93 provided at its lower end with means adapted to engage the frameworks 81 provided within the top of the skip 73, so that when the skip hoist carriage 72 is at its lower limit the transporter crane may be operated to pick up the skip 73 from the hoist carriage 72 and transfer it to a desired location either on the floor of the pond 60 or on top of another similar skip already deposited on the pond floor.

The conveying means includes a control system for the skip hoist and a system of warning lights to indicate any departure from safe working of the apparatus, such a system being necessary because the radio-activity of the spent fuel elements makes direct observation of the fuel elements impracticable.

Thus the electric motor driving the skip hoist drum 77 is remotely controlled, the control for causing the skip hoist carriage 72 to descend being disposed in the control cabin of the loading machine 5 and the control for causing the skip hoist carriage to ascend being disposed in the control cabin of the transporter crane 90.

A V-shaped lever 100 mounted on a bracket carried on the front wall 62 of the chamber 61 is so arranged that when the skip 73 passes the lever in a downward direction it so sets that lever that it closes contacts which cause two flashing red lights to come into operation respectively in the cabins of the loading machine and the transporter crane, while when the skip passes that lever in an upward direction it resets that lever 100 to extinguish the two flashing red lights. On the other hand, movement of the carriage 72 past the lever 100 when no skip is on the carriage has no effect on the lever.

A counterweighted lever (not shown) mounted adjacent the track 71 of the skip hoist is arranged to set a further lever mounted on the skip hoist carriage as the carriage moves downwardly from its uppermost position, and that further lever is arranged to move to an operative position when, after having been so set, the skip 73 is removed from the carriage 72. The counterweighted lever does not affect the lever on the skip hoist carriage as the carriage moves upwardly, and when the carriage is at its uppermost position the further lever, if in its operative position, operates a switch which causes a green light to be lit in the cabin of the loading machine. The green light is extinguished upon movement of the carriage from its uppermost position and the counterweight lever resets the said further lever as the carriage is subsequently moved downwards from its uppermost position.

In the control cabin of the loading machine is disposed a mimic diagram showing in outline form the length of the chute 12 and the discharge chamber 13 and provided with a series of electric lamps disposed along the length of the chute diagram and at the chamber 13. These lamps are energised from a control system actuated by a series of electrical detectors located along the length of the chute at positions corresponding to the positions of the lamps on the mimic diagram, the system being such that as a fuel element passes one of the positions along the chute it illuminates the corresponding lamp on the mimic diagram and extinguishes the preceding lamp. The first position is at the top of the chute, and of course there is no preceding lamp to be extinguished as the corresponding lamp is lit, while the last position is in the discharge chamber 13 and the circuit associated with that position is arranged to maintain the corresponding lamp illuminated only as long as there is a fuel element in the discharge chamber 13.

During operation of the nuclear reactor 1, the reactor is initially charged with fuel elements by the loading machine 5, and after a period of operation it is necessary to remove certain of the fuel elements for processing. The fuel elements so removed are highly radio-active and must be mechanically handled by remotely controlled apparatus.

The loading machine 5 removes a number of the fuel elements from the reactor core and is brought to the unloading position shown in FIGURE 1. The telescopic device is next operated to connect the discharge aperture in the bottom of the loading machine with the top of the chute. The fuel elements are then dropped, one at a time, from the loading machine into the upper end of the chute 12. Each fuel element after a short drop enters the chute 12, by which it is guided to fall at an increasing speed until it enters the curved transition part 12C. Due to the angular acceleration of the element as it passes through the chute part 12C, the frictional force between the chute and the element is increased and the speed of the element decreases until, after it has entered the horizontal terminal portion 12D, it would come to rest if it were not for the propulsive effect of the water jets 20. The discharge of water through the jets 20 is so adjusted that any element reaching the chute part 12D is certain to reach the discharge chamber 13 but reaches the chamber at a suitably low velocity, its forward momentum being destroyed by the buffer 35, whereupon the element sinks into the recess 26.

Assuming that the skip 73 is in position below the discharge chamber 13 so that the cut-off valve 27 is in its open position, the element will drop down through the nozzle 32 into the skip 73. Since the skip is already filled with water discharged from the nozzle 32 and the free fall of the fuel element into the skip is only a very short distance, the fuel element settles gently into the skip 73. The turbulence of the water in both the chamber 13 and the skip 73 is found to assist in the cushioning of the fuel element as it passes from the chute 12 into the skip 73.

The mimic diagram associated with the chute indicates to the operator of the loading machine 5 whether in fact each fuel element passes freely down the chute into the discharge chamber and thence into the skip 73. Until it is clear from the mimic diagram that the fuel element has left the chamber 13 the operator must not release the next fuel element, and if desired an electrical interlock may be incorporated into the operating means for the loading machine to prevent this misoperation when the lamp associated with the chamber 13 is illuminated. Once the fuel element is in the skip, a further fuel element may be released, and the operation repeated until a number of fuel elements appropriate to the skip in use have been dropped into the chute. In practice, it is possible to feed six elements per minute down the chute into the skip in the apparatus described above and illustrated.

When a sufficient number of fuel elements have been fed into the skip, the operator of the loading machine operates the remote control for lowering the skip hoist carriage 72 to its lowermost position. The skip by its downward movement permits the cut-off valve 27 to swing to its closed position so that even if the operator of the loading machine 5 should drop another fuel element into the chute it will be retained safely in the chamber 13, the fact that an element is so held in the chamber being signalled automatically to the operator by continued illumination of the appropriate lamp on the mimic diagram.

As the skip moves downwardly from the chamber 13, the edge of the skip engages the lever 100 and moves it to a position in which the two flashing red lights, respectively in the cabins of the loading machine operator and the transporter crane operator, are illuminated.

As the skip carriage moves downwardly from its uppermost position, the counterweighted lever mounted adjacent the track 71 of the skip hoist sets the further lever mounted on the skip hoist carriage.

Having received the signal of the flashing red light, the transporter crane operator grabs the skip 73 and lifts it from the carriage 72 and moves it to a desired storage location on the floor of the pond. Alternatively, he may move the skip to stack it on top of another similar skip, containing spent fuel elements, which is already resting on the floor of the pond, the presence of the extension 79 on the bottom of the skip facilitating this operation. Removal of the full skip from the carriage 72 moves the said further lever to its operative position.

The crane operator, having stacked the full skip, picks up an empty skip and places it on the carriage 72, and operates the remote control for raising the skip hoist carriage, so that the carriage ascends with the empty skip. The new skip (also referred to as skip 37) resets the lever 100 as it approaches its uppermost position and so cancels the flashing red lights in the cabins of both the loading machine operator and the crane operator. When the carriage reaches its uppermost position the green light is caused to be lit in the cabin of the loading machine. Thus the presence of the green light only will inform the loading machine operator that the full skip has been removed from the carriage, that another skip which he may safely presume is empty has been put on the carriage, and that the carriage and skip are approaching or are at their uppermost positions, he may then feed more fuel elements.

The inadvertent return of the skip carriage 72 without removal of the loaded skip will cancel the two flashing red lights but the absence of the green light in the cabin of the loading machine will indicate the true state of affairs. The loading machine operator thereupon operates his remote control to return the skip carriage 72 to its lower position. The only possible mischance arising from the improper return of the loaded skip is that if one element is already retained in the chamber 13 by the cut-off valve 27, that element will be released into the loaded skip; but since a skip will not be filled to its maximum capacity, it can safely receive this extra element.

With the chute arrangement described and shown there is no danger of a fuel element which is undamaged coming to rest in a part of the chute nearer the upper end than the terminal part 12D. However, it is conceivable that the fuel element may be deformed before entry into the chute or so weakened prior to entry into the chute that in its travel down the chute it becomes deformed in such a manner that it sticks or jams in such an upper part of the chute. Should an element become lodged in this manner, the flow controlling valves associated with the water jets disposed in the upper end of the chute are opened so that a discharge of water from those jets is available to flush the lodged element from the chute. These jets may also be used to wash the chute free from radio-active deposits left by a fuel element passing down the chute.

In the designing of a chute for any particular nuclear reactor the aim will be to cause all the spent fuel elements to come to rest in the terminal portion of the chute (such as the chute part 12D) in the absence of any assistance from water jets or other element advancing means. In practice, some of the elements may actually reach the discharge end of the chute without any assistance, but their velocity will be low.

The deceleration of the fuel elements in the chute is effected by frictional forces, and the amount of braking effected depends upon the force normal to the chute surface and the length of the frictional path. By making the terminal part of the chute of slight upward inclination towards the discharge end, it is possible to increase the centrifugal braking effect on the curved transition part 12C of the chute, to introduce a loss of potential energy along the inclined part, and to increase the length of the chute.

In an emergency, such as upon a breakdown of the skip hoist or the transporter crane, fuel elements may be jettisoned from the loading machine by first rotating the rod 45 so as to raise the emergency door 40 to leave an unrestricted passage through the chamber 13. With the cutoff valve 27 closed and an ample supply of water through jets 20, fuel elements may be dropped one after another into the upper end of chute 12 and drop into the pond about the foot of the skip hoist tracks 71.

In the embodiment of the invention described above, the fuel elements are braked by the frictional force between the elements and the chute. If desired, this frictional force may be supplemented by the action of water jets 120 disposed to discharge water upwardly along the chute parts 12B and 12C and by impact to slow down the falling fuel elements. When this arrangement is used, it is possible to utilise a steeper slope for the chute part 12B and/or a shorter chute part 12D, so giving a more compact chute arrangement.

What is claimed is:

1. Gravity chute conveying means for the safe transport of used nuclear fuel elements from an upper level to a lower level comprising an upper end of the chute arranged at the upper level, a discharge end of the chute arranged at the lower level, an initial part of the chute having a steep inclination in which the fuel elements are capable of rapid descent under the influence of gravity, a nozzle arranged to discharge a jet of water upwardly into the initial part of the chute towards the upper level in such a manner as to effect braking of the descending fuel elements, a terminal part of the chute which is horizontal or substantially horizontal and in which the fuel elements are subject to frictional braking, so that at least some of the fuel elements would be brought to rest in that terminal part, and at least one nozzle arranged to discharge a jet of water into the terminal part of the chute in the direction of the discharge end of the chute, whereby fuel elements coming to rest in the terminal part of the chute are conveyed at low velocity to the discharge end of the chute.

2. Gravity chute conveying means for the safe transport of used nuclear fuel elements from an upper level to a lower level comprising an upper end of the chute arranged at the upper level, a discharge end of the chute arranged at the lower level, an initial part of the chute having a steep inclination in which the fuel elements are capable of rapid descent under the influence of gravity, a nozzle arranged to discharge a jet of water upwardly into the initial part of the chute towards the upper level in such a manner as to effect braking of the descending fuel elements, means for supplying water to said nozzle including valve means for controlling the flow of water to the nozzle, a terminal part of the chute which is horizontal or substantially horizontal and in which the fuel elements are subject to frictional braking, so that at least some of the fuel elements would be brought to rest in that terminal part, and at least one nozzle arranged to discharge a jet of water into the terminal part of the chute in the direction of the discharge end of the chute, whereby fuel elements coming to rest in the terminal part of the chute are conveyed at low velocity to the discharge end of the chute.

3. Gravity chute conveying means for the safe transport of used nuclear fuel elements from an upper level to a lower level comprising an upper end of the chute arranged at the upper level, a discharge end of the chute arranged at the lower level, a chamber located at the discharge end of the chute for receiving used fuel elements therefrom, an initial part of the chute having a steep inclination in which the fuel elements are capable of rapid descent under the influence of gravity, a terminal part of the chute which is horizontal or substantially horizontal and in which the fuel elements are subject to frictional braking so that at least some of the fuel elements would be brought to rest in that terminal part, at least one nozzle arranged to discharge a jet of water into the terminal part of the chute in the direction of the discharge end of the chute so that fuel elements coming to rest in the terminal part of the chute are conveyed at low velocity to the discharge end of the chute and into the chamber, said chamber having a bottom outlet through which fuel elements are discharged downwardly in a direction substantially normal to the adjacent part of the chute, and a door in the wall of the chamber opposite the discharge end of the chute so that when the door is open fuel elements may pass forwardly from the chute through the doorway.

References Cited in the file of this patent

UNITED STATES PATENTS

| | | |
|---|---|---|
| 687,231 | Hay | Nov. 26, 1901 |
| 1,094,263 | Stevens | Apr. 21, 1914 |
| 1,911,880 | Brown | May 3, 1933 |
| 2,124,964 | Klyver | July 26, 1938 |
| 2,743,224 | Ohlinger | Apr. 24, 1956 |
| 2,770,591 | Wigner et al. | Nov. 13, 1956 |
| 2,778,692 | Makinson | Jan. 22, 1957 |
| 2,803,601 | Cooper | Aug. 20, 1957 |

OTHER REFERENCES

"Nucleonics," vol. 14, No. 11, November 1956, page 138.